(12) United States Patent
Huang

(10) Patent No.: US 8,418,584 B2
(45) Date of Patent: Apr. 16, 2013

(54) CLUTCH-TYPE ELECTRICAL DRIVING DEVICE FOR BICYCLE AND CLUTCH-TYPE DRIVE THEREOF

(75) Inventor: Yung-Sung Huang, Taipei (TW)

(73) Assignees: Huang Yung-Sung, Taipei (TW); Action Intellectual Property Tech Co. Ltd., New Taipei (TW)

( * ) Notice: Subject to any disclaimer, the term of this patent is extended or adjusted under 35 U.S.C. 154(b) by 233 days.

(21) Appl. No.: 13/093,908

(22) Filed: Apr. 26, 2011

(65) Prior Publication Data

US 2012/0234118 A1 Sep. 20, 2012

(51) Int. Cl.
*F16H 37/06* (2006.01)
(52) U.S. Cl.
USPC .................. 74/665 A; 74/665 B; 74/665 C
(58) Field of Classification Search .............. 74/325, 74/665 A, 665 B, 665 C
See application file for complete search history.

(56) References Cited

U.S. PATENT DOCUMENTS

| 4,260,386 | A | * | 4/1981 | Frohardt | 474/72 |
| 5,004,083 | A | * | 4/1991 | Lohman | 192/217.1 |
| 5,404,768 | A | * | 4/1995 | Hwang et al. | 74/371 |
| 2011/0168472 | A1 | * | 7/2011 | Li et al. | 180/206.4 |

FOREIGN PATENT DOCUMENTS

JP  2000318674 A  * 11/2000

* cited by examiner

*Primary Examiner* — Ha D Ho
(74) *Attorney, Agent, or Firm* — Che-Yang Chen; Law Office of Michael Chen

(57) ABSTRACT

A clutch-type electrical driving device for a bicycle includes a first one-way bearing provided between a transmission sprocket assembly and an electrical driving assembly, and a second one-way bearing provided between the transmission sprocket assembly and a pedal driving assembly. When a user selects to drive sprockets via the electrical driving assembly for moving the bicycle forward, the sprockets would not feed back to bring two pedal assemblies to rotate at the same time. On the other hand, when the user selects to drive the bicycle forward via the pedal driving assemblies, the sprockets would not feed back to rotate the electrical driving assembly. Therefore, the user can ride the bicycle safely because the pedal assemblies would not rotate along with the sprockets when the latter are driven by the electrical driving device to rotate at high speed. A clutch-type drive for the electrical driving device is also disclosed.

17 Claims, 5 Drawing Sheets

CLUTCH-TYPE ELECTRICAL DRIVING DEVICE FOR BICYCLE AND CLUTCH-TYPE DRIVE THEREOF

FIELD OF THE INVENTION

The present invention relates to a clutch-type electrical driving device for a bicycle and a clutch-type drive thereof, and more particularly to a driving device that enables an electrical driving assembly and a pedal shaft driving assembly to respectively perform one-way clutch.

BACKGROUND OF THE INVENTION

Bicycles have been widely applied in many leisure and sporting activities and are one of many popular transport means for people in their daily lives. A bicycle rider applies forces on two pedals to drive a chainwheel or a sprocket to rotate, which in turn brings a rear wheel of the bicycle to rotate and provide a source of force for moving the bicycle forward. However, a bicycle rider, particularly an aged, a female or a child, might become exhaustive when riding uphill or riding for a long distance. To overcome this problem, an electric bicycle or a power-aided bicycle has been developed and introduced into market. With the electric bicycle, the rider may select to drive the chainwheel via an electrical driving assembly instead of the pedals.

While the electric bicycle is convenient, the structural design is complicated and it requires relatively high manufacturing cost. It is therefore a pity the electric bicycle is not widely accepted among consumers due to its high selling price. Moreover, the electrical driving assembly added to the bicycle is too heavy and occupies a considerable space, giving the bicycle an increased overall weight and somewhat cumbersome appearance. Another disadvantage in the currently available electric bicycle is that when the electrical driving assembly drives the chainwheel to rotate and thereby moves the bicycle forward, the rotating chainwheel would bring a pedal shaft assembly connected thereto to rotate along with it, causing two pedals connected to two ends of the pedal shaft assembly to rotate at the same time at high speed. Under this condition, the rider just could not position his or her feet on the pedals and would dangerously lose his or her balance on the bicycle to even cause an accident in a worse condition. Therefore, the inventor develops a clutch-type electrical driving device for the electric bicycle and a clutch-type drive thereof, in order to overcome the drawbacks existed in conventional electric bicycles and to increase the applicability thereof.

SUMMARY OF THE INVENTION

A primary object of the present invention is to provide a novel, non-obvious, and industrially useful clutch-type electrical driving device for a bicycle and a clutch-type drive thereof, so as to overcome the drawbacks as found in conventional electrical driving devices for a bicycle.

To achieve the above and other objects, the clutch-type electrical driving device for a bicycle according to the present invention includes a support tube, a vertical-shaft motor, a gear governor, a shaft support, a pedal shaft, a shaft sleeve, a transmission sprocket assembly, a first one-way bearing, and a second one-way bearing.

The support tube is a hollow tube, and the vertical-shaft motor is correspondingly axially mounted inside the support tube. The gear governor is internally provided with at least one reduction gear set and mounted on a rotatable driving shaft of the vertical-shaft motor to thereby axially mount on the support tube. Through a gear ratio thereof, the reduction gear set is able to regulate the rotatable driving shaft to a reduced rotating speed, which is then output via an output shaft of the gear governor. A first steering gear is mounted on the output shaft and is driven by the output shaft to rotate. The shaft support is correspondingly connected to a lower end of the support tube to locate around the first steering gear, and the shaft support is provided at two opposite lateral end walls with a first shaft hole and a second shaft hole respectively. The pedal shaft is rotatably and transversely extended through the shaft support with two opposite ends of the pedal shaft projected from the first and the second shaft hole. The shaft sleeve is a long tubular member rotatably fitted around the pedal shaft, and is rotatably extended through the second shaft hole of the shaft support. The shaft sleeve has an inner end that extends through the second shaft hole into the shaft support; and a second steering gear is mounted on the inner end of the shaft sleeve to be driven by the first steering gear to convert a force output via the output shaft of the vertical-shaft motor into a horizontal rotating force output. The transmission sprocket assembly includes a plurality of adjacent sprockets, which are correspondingly fitted around the shaft sleeve. An inner bearing connection element is mounted on one of the sprockets, and defines an inner bearing hole for correspondingly fitting around an outer end of the shaft sleeve. An outer bearing connection element is mounted to an outer side of the inner bearing connection element, and defines an outer bearing hole for correspondingly fitting around the pedal shaft. The first one-way bearing is correspondingly fitted in the inner bearing hole and connected to the shaft sleeve; and the second one-way bearing is correspondingly fitted in the outer bearing hole and connected to the pedal shaft.

In a preferred embodiment of the present invention, the vertical-shaft motor is a power-driven motor having a long cylindrical configuration, the gear governor is a speed reducer, the first steering gear and the second steering gear are respectively a sector gear, and are positioned perpendicular to each other to mesh with each other. A first bearing unit is provided between the pedal shaft and the first shaft hole, while a second bearing unit is provided between the shaft sleeve and the second shaft hole. The pedal shaft has a first end, which is projected from the first shaft hole to fixedly connect to a first pedal assembly, so as to rotate along with the first pedal assembly, and the pedal shaft has an opposite second end, which is projected from the second shaft hole to fixedly connect to a second pedal assembly, so as to rotate along with the second pedal assembly.

In the preferred embodiment, the first one-way bearing has an inner ring and an outer ring. The inner ring is not rotatable along with the outer ring of the first one-way bearing in a single rotating direction, but is rotatable along with the outer ring in an opposite rotating direction; and the outer ring of the first one-way bearing is correspondingly fitted in the inner bearing hole while the inner ring of the first one-way bearing is correspondingly fitted around the shaft sleeve. Similarly, the second one-way bearing in the preferred embodiment has a second inner ring and a second outer ring. The second inner ring is not rotatable along with the second outer ring of the second one-way bearing in a single rotating direction, but is rotatable along with the second outer ring in an opposite rotating direction; and second the outer ring of the second one-way bearing is correspondingly fitted in the outer bearing hole while the second inner ring of the second one-way bearing is correspondingly fitted around the pedal shaft.

To achieve the above and other objects, the clutch-type drive according to the present invention includes a drive unit, a gear module, a shaft support, a pedal shaft, a shaft sleeve, a transmission sprocket assembly, a first one-way bearing, and a second one-way bearing.

The drive unit has a rotatable driving shaft, and the gear module is internally provided with at least one reduction gear set and mounted on the rotatable driving shaft of the drive unit. The gear module has an output shaft for outputting a rotating force, and a first steering gear is mounted on the output shaft. The shaft support is fitted around the first steering gear, and is provided on two opposite lateral end walls with a first shaft hole and a second shaft hole. The pedal shaft is transversely and rotatably extended through the shaft support with two ends projected from the first and the second shaft hole. The shaft sleeve is correspondingly fitted around the pedal shaft, and has an inner end extended into the shaft support via the second shaft hole, and a second steering gear is mounted on the inner end of the shaft sleeve and is correspondingly driven by the first steering gear to rotate. The transmission sprocket assembly includes a plurality of adjacent sprockets, which are correspondingly fitted around the shaft sleeve. The first one-way gear is correspondingly mounted on the transmission sprocket assembly and connected to the shaft sleeve, and the second one-way gear is correspondingly mounted on the transmission sprocket assembly and connected to the pedal shaft.

In a preferred embodiment of the present invention, the drive unit is a vertical-shaft motor; the gear module is a gear governor; an inner bearing connection element is mounted on one of the sprockets; and an outer bearing connection element is mounted to an outer side of the inner bearing connection element. The inner bearing connection element defines an inner bearing hole, which is correspondingly fitted around an outer end of the shaft sleeve; and the outer bearing connecting element defines an outer bearing hole, which is correspondingly fitted around the pedal shaft. The first one-way bearing is fitted in the inner bearing hole, while the second one-way bear is fitted in the outer bearing hole.

The first one-way bearing has an inner ring and an outer ring, wherein the inner ring is not rotatable along with the outer ring of the first one-way bearing in a single rotating direction, but is rotatable along with the outer ring in an opposite rotating direction; and the outer ring of the first one-way bearing is correspondingly fitted in the inner bearing hole while the inner ring of the first one-way bearing is correspondingly fitted around the shaft sleeve. The second one-way bearing has an inner ring and an outer ring, wherein the inner ring is not rotatable along with the outer ring of the second one-way bearing in a single rotating direction, but is rotatable along with the outer ring in an opposite rotating direction; and the outer ring of the second one-way bearing is correspondingly fitted in the outer bearing hole while the inner ring of the second one-way bearing is correspondingly fitted around the pedal shaft.

According to the clutch-type electrical driving device for a bicycle provided by the present invention, a one-way bearing is provided between the sprockets and the electrical driving assembly, while another one-way bearing is provided between the sprockets and the pedal driving assembly. In this manner, a user may select to rotate the sprockets by the electrical driving assembly, so as to drive the bicycle to move forward without bringing the pedal assemblies to rotate. Therefore, it is possible to protect the user against any danger when riding the bicycle because the pedal assemblies would not rotate along with the sprockets that are driven by the electrical driving assembly to rotate at high speed.

DETAILED DESCRIPTION OF THE PREFERRED EMBODIMENTS

The present invention will now be described with a preferred embodiment thereof and with reference to the accompanying drawings. It is understood the accompanying drawings are illustrated only for assisting in describing the present invention and are not necessarily in compliance with the exact or precise size proportion and part arrangement of a real product manufactured through implementing the present invention. Therefore, the size proportion and part arrangement shown in the accompanying drawings are not intended to limit the present invention, which is intended to be limited only by the appended claims.

Figure 1:
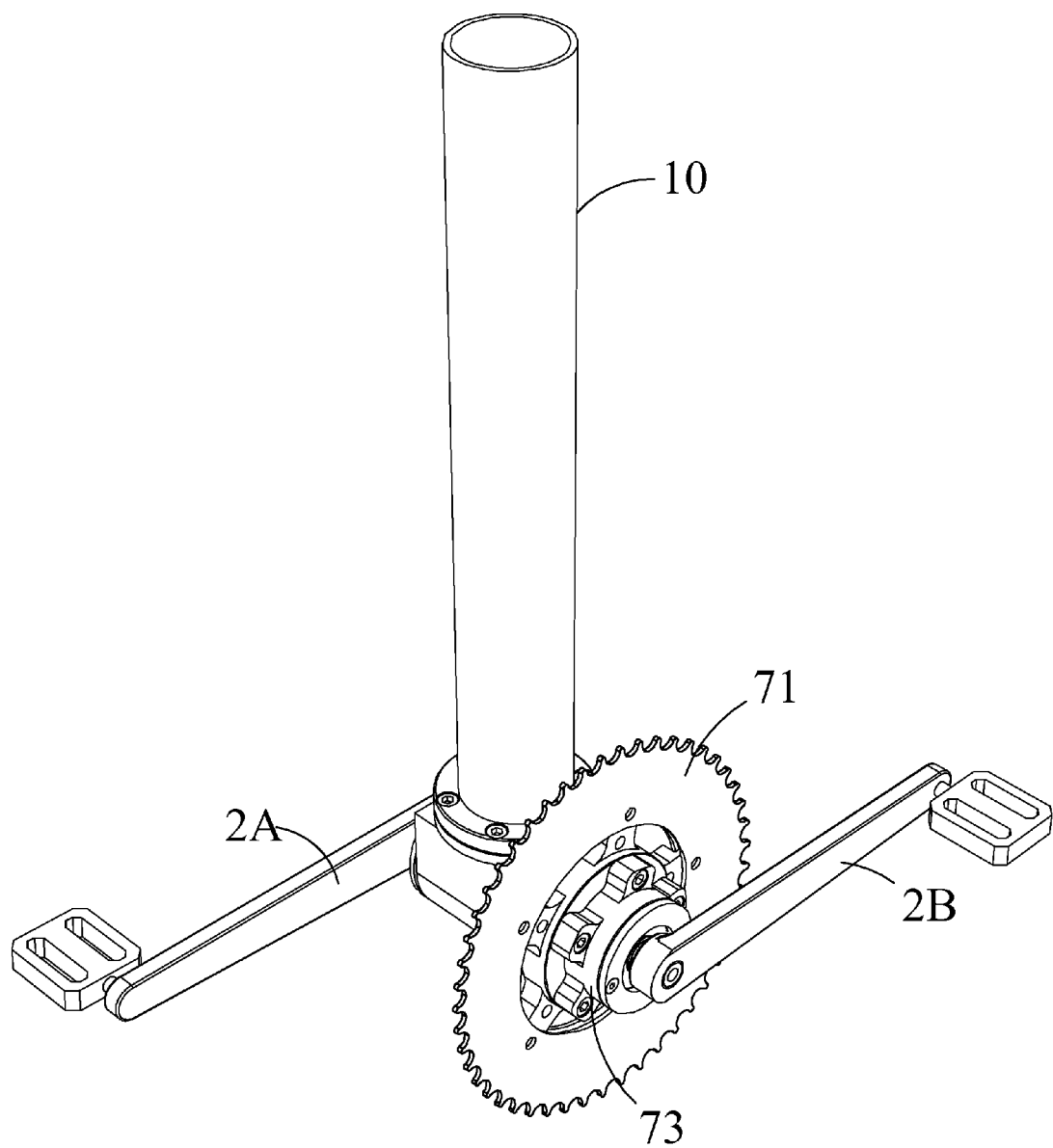
FIG. 1 is an external appearance view of a clutch-type electrical driving device for bicycle according to a preferred embodiment of the present invention.
Figure 2:
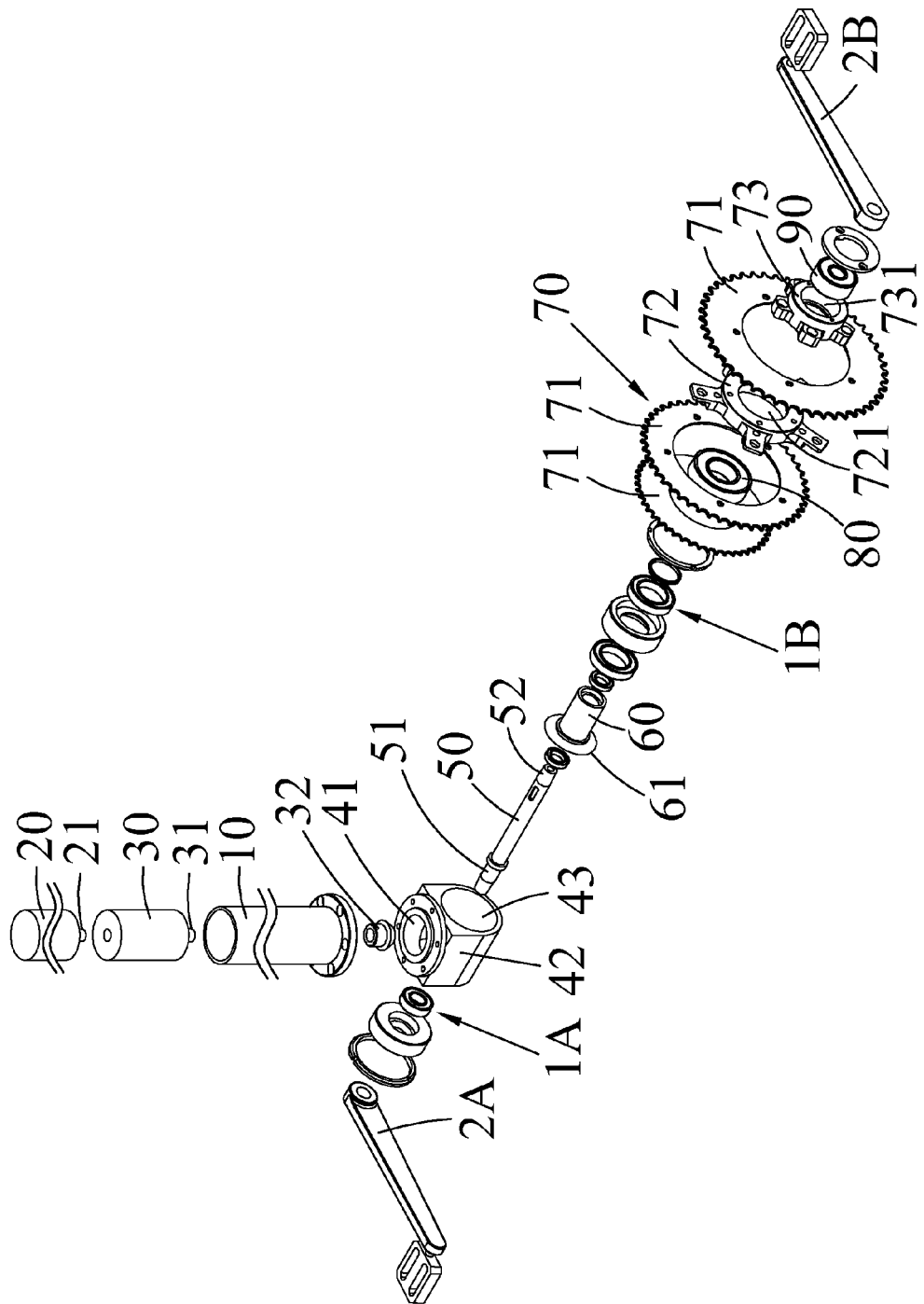
FIG. 2 is an exploded view of FIG. 1.
Figure 3:
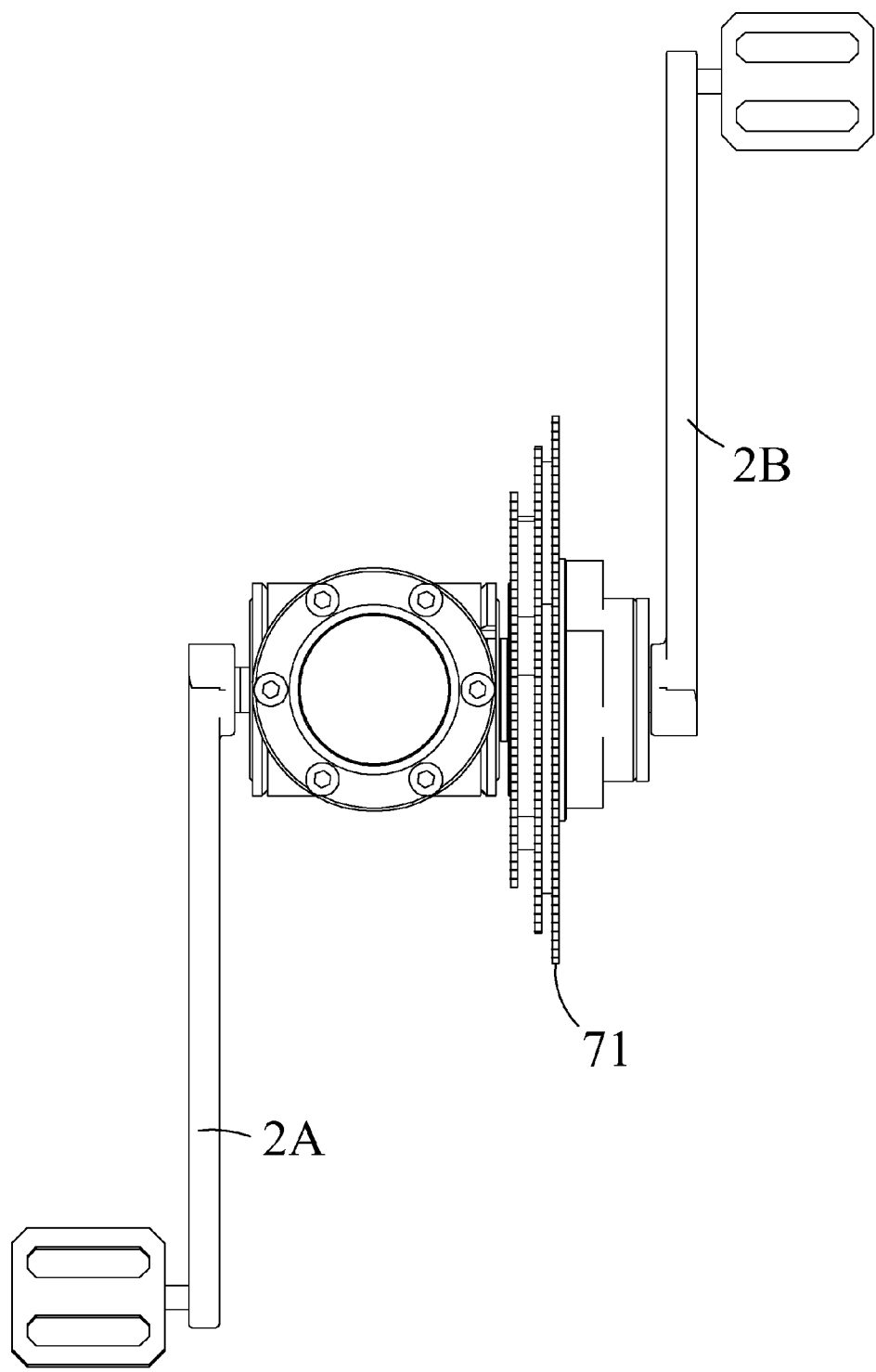
FIG. 3 is a top view of FIG. 1.
Figure 4:
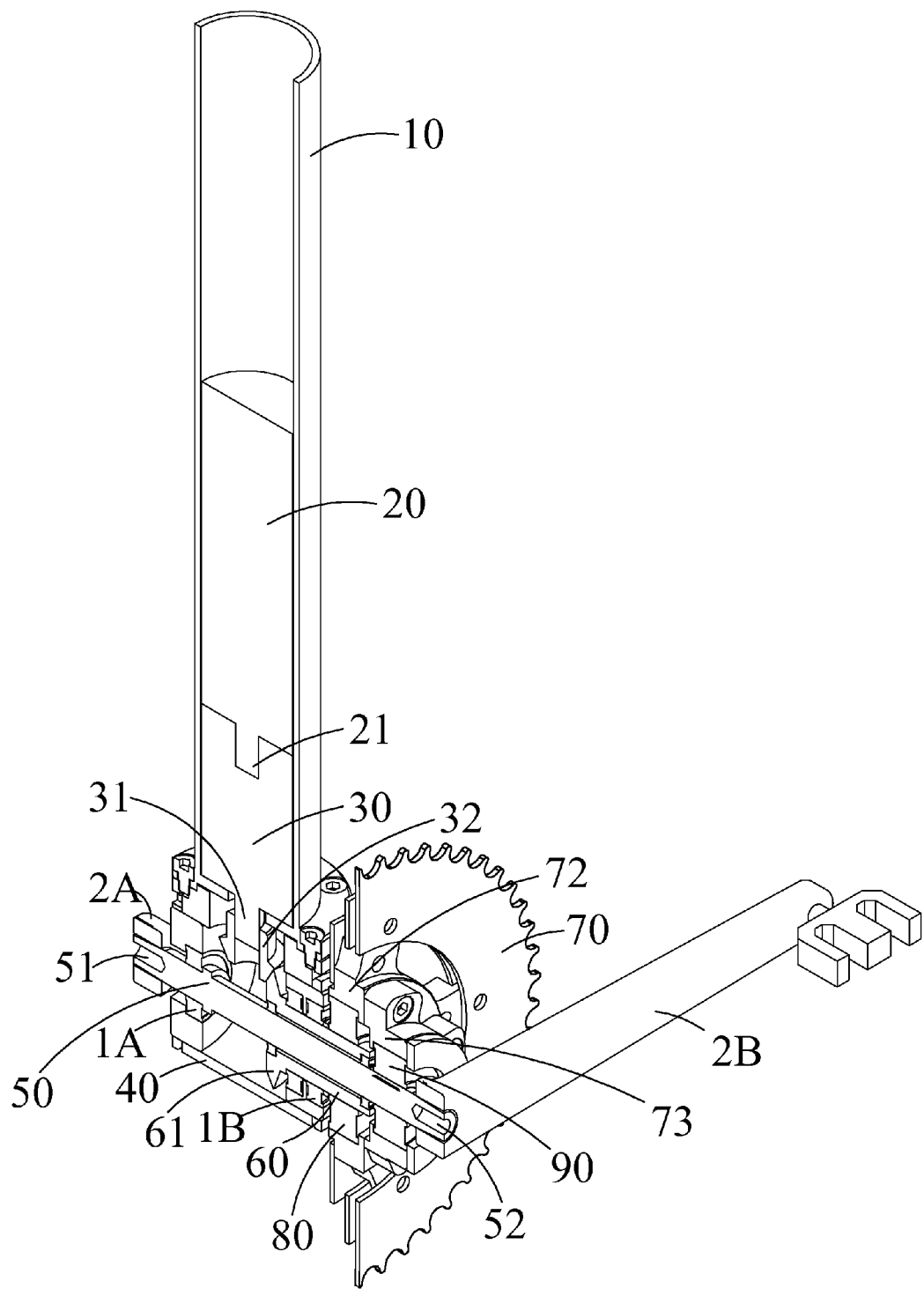
FIG. 4 is a cross-sectional external appearance view of FIG. 1.
Figure 5:
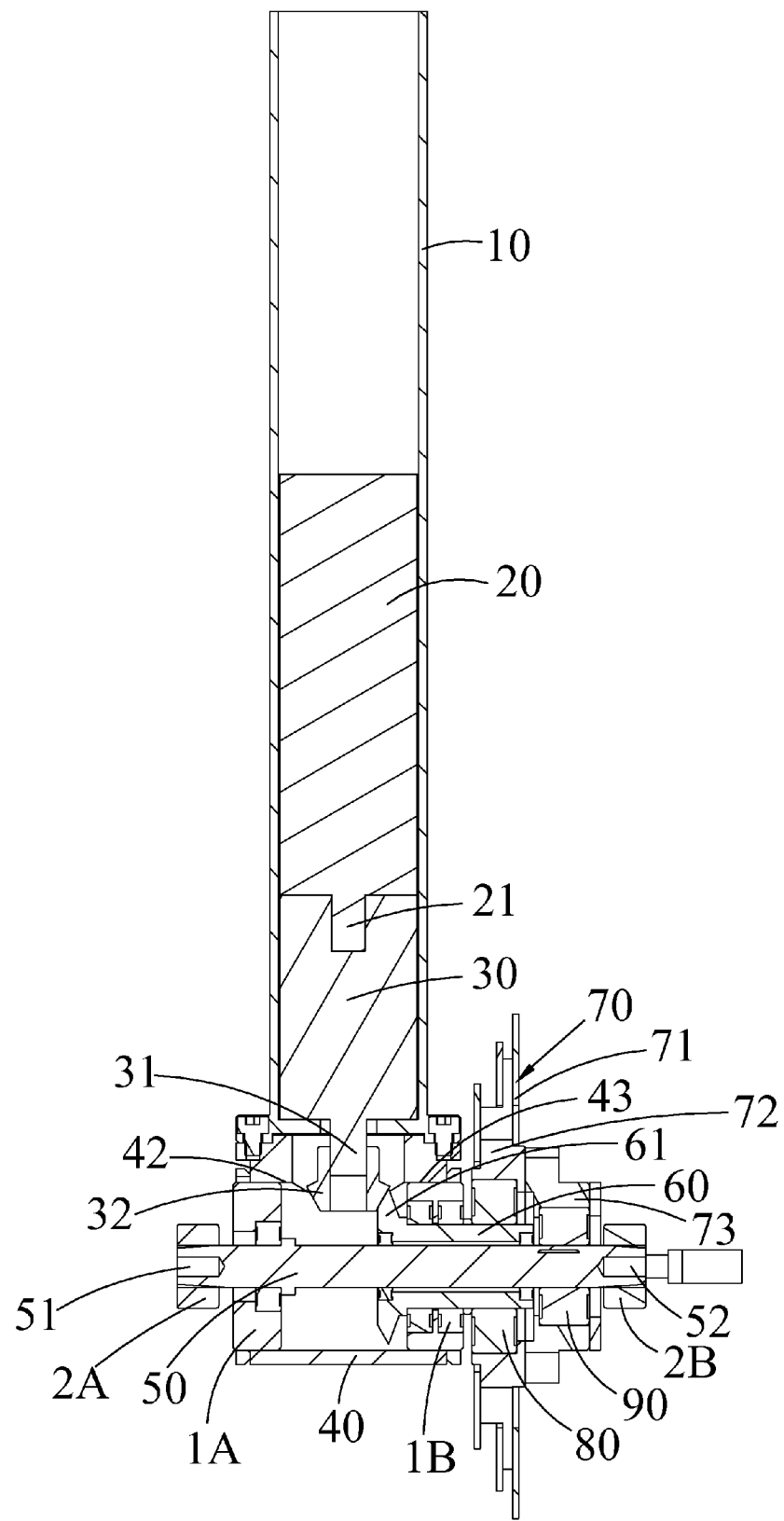
FIG. 5 is a side cross-sectional view of FIG. 1.

Referring to FIGS. 1 to 5, a clutch-type electrical driving device for a bicycle according to a preferred embodiment of the present invention includes a support tube 10, a vertical-shaft motor 20, a gear governor 30, a shaft support 40, a pedal shaft 50, a shaft sleeve 60, a transmission sprocket assembly 70, a first one-way bearing 80, and a second one-way bearing 90.

The support tube 10 is a long hollow tube with an upper end thereof connected to a saddle of the bicycle.

The vertical-shaft motor 20 is a power-driven motor having a long cylindrical configuration, and is axially mounted inside the support tube 10. The vertical-shaft motor 20 has a downward projected rotatable driving shaft 21.

The gear governor 30 is a speed reducer internally provided with at least one reduction gear set, and is mounted on the rotatable driving shaft 21 of the vertical-shaft motor 20 to axially mount in the support tube 10. Through a gear ratio thereof, the reduction gear set is able to regulate the rotatable driving shaft 21 to a reduced rotating speed, which is then output via an output shaft 31 of the gear governor 30. Since the setting of gear ratio is a known skill that has long been utilized in the gear transmission field and can be easily employed or replaced by one of ordinary skill in the art, and since the setting of gear ratio is not a subject matter of the present invention, details about the gear ratio setting of the gear governor 30 are not discussed herein. A first steering gear 32 is mounted on the output shaft 31, such that the first steering gear 32 is connected to and retained to the output shaft 31 and accordingly, driven by the output shaft 31 to rotate. Alternatively, the first steering gear 32 can be a sector gear.

The shaft support 40 is connected to a lower end of the support tube 10 to locate around the first steering gear 32. The shaft support 40 is provided on a top wall with a through hole 41, which communicates with an internal space of the support tube 10 to allow the first steering gear 32 to extend through the through hole 41. Further, the shaft support 40 is also provided on two opposite lateral end walls with a first shaft hole 42 and a second shaft hole 43.

The pedal shaft 50 is rotatably extended through the shaft support 40 with two opposite ends of the pedal shaft 50 projected from the first and the second shaft hole 42, 43.

At least one first bearing unit 1A is provided between the pedal shaft 50 and the first shaft hole 42 to allow the pedal shaft 50 to smoothly rotate relative to the first shaft hole 42. And, an end of the pedal shaft 50 projected from the first shaft hole 42 is herein defined as a first end 51, which is fixedly connected to a first pedal assembly 2A so as to rotate along with the first pedal assembly 2A. On the other hand, another end of the pedal shaft 50 projected from the second shaft hole 43 is herein defined as a second end 52, which is fixedly connected to a second pedal assembly 2B so as to rotate along with the second pedal assembly 2B.

The shaft sleeve 60 is a long hollow tubular member rotatably fitted around the pedal shaft 50 and is rotatably extended through the second shaft hole 43. At least one second bearing unit 1B is provided between the pedal shaft 50 and the second shaft hole 43. The shaft sleeve 60 has an inner end that extends through the second shaft hole 43 into the shaft support 40. A second steering gear 61 in the form of a sector gear is mounted on the inner end of the shaft sleeve 60 corresponding to the first steering gear 32, and is in a position perpendicular to the first steering gear 32 as well as meshes with the first steering gear 32, so as to convert a force output via the output shaft 31 of the vertical-shaft motor 30 into a horizontal rotating force output.

The transmission sprocket assembly 70 includes a plurality of adjacent sprockets 71, which are mounted around the shaft sleeve 60. An inner bearing connection element 72 is mounted to one of the sprockets 71 and defines an inner bearing hole 721 for correspondingly fitting around an outer end of the shaft sleeve 60. Further, an outer bearing connection element 73 is fixedly mounted to an outer side of the inner bearing connection element 72 and defines an outer bearing hole 731 for correspondingly fitting around the pedal shaft 50.

The first one-way bearing 80 includes an inner ring and an outer ring. The inner ring of the first one-way bearing 80 is not rotatable along with the outer ring in a single rotating direction, but is rotatable along with the outer ring in an opposite rotating direction. The outer ring of the first one-way bearing 80 is correspondingly fitted in the inner bearing hole 721 while the inner ring of the first one-way bearing 80 is correspondingly fitted around the shaft sleeve 60. Therefore, the output shaft 31 in rotating would correspondingly drive the transmission sprocket assembly 70 to rotate at the same time while the transmission sprocket assembly 70 in rotating does not feed back to affect the output shaft 31.

The second one-way bearing 90 includes an inner ring and an outer ring. The inner ring of the second one-way bearing 90 is not rotatable along with the outer ring in a single rotating direction, but is rotatable along with the outer ring in an opposite rotating direction. The outer ring of the second one-way bearing 90 is correspondingly fitted in the outer bearing hole 731 while the inner ring of the second one-way bearing 90 is correspondingly fitted around the pedal shaft 50. Therefore, the pedal shaft 50 in rotating would correspondingly drive the transmission sprocket assembly 70 to rotate at the same time while the transmission sprocket assembly 70 in rotating does not feed back to affect the pedal shaft 50.

According to the clutch-type electrical driving device for a bicycle provided by the present invention, a one-way bearing is provided between the sprockets 71 and an electrical driving assembly, while another one-way bearing is provided between the sprockets 71 and a pedal driving assembly. In this manner, a user may select to rotate the sprockets 71 by the electrical driving assembly, so as to drive the bicycle to move forward without bringing the pedal assemblies 2A, 2B to rotate. Therefore, the user would be protected against any discomfort and danger when riding the bicycle because the pedal assemblies 2A, 2B would not rotate along with the sprockets 71 that are driven by the electrical driving assembly to rotate at high speed. On the other hand, when the user selects to drive the sprockets 71 of the bicycle via the pedal assemblies 2A, 2B, the sprockets 71 would not feed back to bring the output shaft 31 and other electrical driving components to rotate. This in turn reduces the rider's burden in applying force to pedal and avoids the internal components of the electrical driving device from unnecessary frictional loss. With these arrangements, the clutch-type electrical driving device for a bicycle according to the present invention is superior to the prior art due to its largely improved utility and safety in use.

The present invention has been described with a preferred embodiment thereof and it is understood that many changes and modifications in the described embodiment can be carried out without departing from the scope and the spirit of the invention that can be limited only by the appended claims.

What is claimed is:

1. A clutch-type drive, comprising:
a drive unit having a rotatable driving shaft;
a gear module being internally provided with at least one reduction gear set and being mounted on the rotatable driving shaft of the drive unit; the gear module having an output shaft for outputting a rotating force; and a first steering gear being mounted on the output shaft;
a shaft support being fitted around the first steering gear;
a pedal shaft being transversely and rotatably extended through the shaft support;
a shaft sleeve being correspondingly fitted around the pedal shaft, and having an inner end extended into the shaft support; and a second steering gear being mounted on the inner end of the shaft sleeve to be correspondingly driven by the first steering gear to rotate;
a transmission sprocket assembly including a plurality of adjacent sprockets, which are correspondingly fitted around the shaft sleeve;
a first one-way bearing being correspondingly mounted on the transmission sprocket assembly and connected to the shaft sleeve; and
a second one-way bearing being correspondingly mounted on the transmission sprocket assembly and connected to the pedal shaft.

2. The clutch-type drive as claimed in claim 1, wherein the drive unit is a vertical-shaft motor.

3. The clutch-type drive as claimed in claim 1, wherein the gear module is a gear governor.

4. The clutch-type drive as claimed in claim 1, wherein the shaft support is provided on two opposite lateral end walls with a first shaft hole and a second shaft hole, and the pedal shaft is transversely and rotatably extended through the shaft support with two opposite ends of the pedal shaft projected from the first and the second shaft hole, and the inner end of the shaft sleeve is extended into the shaft support via the second shaft hole.

5. The clutch-type drive as claimed in claim 1, further comprising an inner bearing connection element mounted on one of the sprockets and an outer bearing connection element mounted to an outer side of the inner bearing connection element; the inner bearing connection element defining an inner bearing hole, which is correspondingly fitted around an outer end of the shaft sleeve; the outer bearing connecting element defining an outer bearing hole, which is correspondingly fitted around the pedal shaft; the first one-way bearing being fitted in the inner bearing hole; and the second one-way bear being fitted in the outer bearing hole.

6. The clutch-type drive as claimed in claim 5, wherein the first one-way bearing has an inner ring and an outer ring; the inner ring being not rotatable along with the outer ring of the first one-way bearing in a single rotating direction, but being rotatable along with the outer ring in an opposite rotating direction; and the outer ring of the first one-way bearing being correspondingly fitted in the inner bearing hole, while the inner ring of the first one-way bearing being correspondingly fitted around the shaft sleeve.

7. The clutch-type drive as claimed in claim 5, wherein the second one-way bearing has an inner ring and an outer ring; the inner ring being not rotatable along with the outer ring of the second one-way bearing in a single rotating direction, but being rotatable along with the outer ring in an opposite rotating direction; and the outer ring of the second one-way bearing being correspondingly fitted in the outer bearing hole while the inner ring of the second one-way bearing being correspondingly fitted around the pedal shaft.

8. A clutch-type electrical driving device for a bicycle, comprising:
   a hollow supporting tube;
   a vertical-shaft motor being correspondingly axially mounted inside the supporting tube;
   a gear governor being internally provided with at least one reduction gear set; the gear governor being mounted on a rotatable driving shaft of the vertical-shaft motor to axially mount in the supporting tube; through a gear ratio thereof, the reduction gear set being able to regulate the rotatable driving shaft to a reduced rotating speed, which is then output via an output shaft of the gear governor; and a first steering gear being mounted on the output shaft and being driving by the output shaft to rotate;
   a shaft support being correspondingly connected to a lower end of the supporting tube to locate around the first steering gear, and the shaft support being provided at two opposite lateral end walls with a first shaft hole and a second shaft hole;
   a pedal shaft being rotatably and transversely extended through shaft support with two opposite ends of the pedal shaft projected from the first and the second shaft hole;
   a shaft sleeve being a long tubular member rotatably fitted around the pedal shaft, and being rotatably extended through the second shaft hole of the shaft support; the shaft sleeve having an inner end that extends through the second shaft hole into the shaft support;
   a second steering gear being mounted on the inner end of the shaft sleeve and being correspondingly driven by the first steering gear to convert a force output via the output shaft of the vertical-shaft motor into a horizontal rotating force output;
   a transmission sprocket assembly including a plurality of adjacent sprockets, which are correspondingly fitted around the shaft sleeve; an inner bearing connection element being mounted on one of the sprockets and defining an inner bearing hole for correspondingly fitting around an outer end of the shaft sleeve; and an outer bearing connection element being mounted to an outer side of the inner bearing connection element and defining an outer bearing hole for correspondingly fitting around the pedal shaft;
   a first one-way bearing being correspondingly fitted in the inner bearing hole and connected to the shaft sleeve; and
   a second one-way bearing being correspondingly fitted in the outer bearing hole and connected to the pedal shaft.

9. The clutch-type electrical driving device for a bicycle as claimed in claim 8, wherein the vertical-shaft motor is a power-driven motor having a long cylindrical configuration.

10. The clutch-type electrical driving device for a bicycle as claimed in claim 8, wherein the gear governor is a speed reducer.

11. The clutch-type electrical driving device for a bicycle as claimed in claim 8, wherein the first steering gear and the second steering gear are both sector gears, and are positioned perpendicular to each other to mesh with each other.

12. The clutch-type electrical driving device for a bicycle as claimed in claim 8, further comprising a first bearing unit provided between the pedal shaft and the first shaft hole.

13. The clutch-type electrical driving device for a bicycle as claimed in claim 8, further comprising a second bearing unit provided between the shaft sleeve and the second shaft hole.

14. The clutch-type electrical driving device for a bicycle as claimed in claim 8, wherein the pedal shaft has a first end, which is projected from the first shaft hole to fixedly connect to a first pedal assembly, so as to rotate along with the first pedal assembly; and the pedal shaft has an opposite second end, which is projected from the second shaft hole to fixedly connect to a second pedal assembly, so as to rotate along with the second pedal assembly.

15. The clutch-type electrical driving device for a bicycle as claimed in claim 8, wherein the first one-way bearing has an inner ring and an outer ring; the inner ring being not rotatable along with the outer ring of the first one-way bearing in a single rotating direction, but being rotatable along with the outer ring in an opposite rotating direction; and the outer ring of the first one-way bearing being correspondingly fitted in the inner bearing hole while the inner ring of the first one-way bearing being correspondingly fitted around the shaft sleeve.

16. The clutch-type electrical driving device for a bicycle as claimed in claim 15, wherein the second one-way bearing has an inner ring and an outer ring; the inner ring being not rotatable along with the outer ring of the second one-way bearing in a single rotating direction, but being rotatable along with the outer ring in an opposite rotating direction; and the outer ring of the second one-way bearing being correspondingly fitted in the outer bearing hole while the inner ring of the second one-way bearing being correspondingly fitted around the pedal shaft.

17. The clutch-type electrical driving device for a bicycle as claimed in claim 8, wherein the shaft support is provided on a top wall with a through hole, which communicates with an internal space of the supporting tube to allow the first steering gear to extend through the through hole into the shaft support.

* * * * *